United States Patent
Mashimo

[15] 3,688,664
[45] Sept. 5, 1972

[54] FLASH DEVICE FOR A CAMERA
[72] Inventor: Yukio Mashimo, Tokyo, Japan
[73] Assignee: Canon Kabushiki Kaisha, Tokyo, Japan
[22] Filed: Dec. 4, 1970
[21] Appl. No.: 95,290

[30] Foreign Application Priority Data

| Dec. 10, 1969 | Japan | 44/117914 |
| Jan. 14, 1970 | Japan | 45/4555 |
| Feb. 18, 1970 | Japan | 45/13951 |
| Feb. 18, 1970 | Japan | 45/13952 |
| Feb. 20, 1970 | Japan | 45/14628 |

[52] U.S. Cl............95/11.5 R, 95/10 C, 95/53 EA, 315/241 P
[51] Int. Cl.......................G03b 15/05, H05b 41/00
[58] Field of Search....95/11.5 R, 11 R, 10 C, 10 CE, 95/10 CT, 53 E, 53 EA, 53 EB; 315/241 P

[56] References Cited
UNITED STATES PATENTS 3,273,478  9/1966  Kinder......................95/11 R
3,568,582  3/1971  Uchida et al.............95/53 EB
3,522,763  8/1970  Dietz.......................95/10 CT
3,460,450  8/1969  Ogihara...................95/53 EB

FOREIGN PATENTS OR APPLICATIONS

1,938,528  2/1970  Germany.................95/53 EB

Primary Examiner—Samuel S. Matthews
Assistant Examiner—Robert P. Greiner
Attorney—McGlew and Toren

[57] ABSTRACT

A flash device for a camera comprising a flash circuit for illumination of a flash lamp, a detector circuit for detecting an output of the flash circuit, and an indicator means for indicating the state of the flash circuit under the control of the detector circuit to indicate operative condition of the camera.

22 Claims, 16 Drawing Figures

INVENTOR.
YUKIO MASHIMO
BY McGraw and Toren
ATTORNEYS

INVENTOR.
YUKIO MASHIMO

INVENTOR.
YUKIO MASHIMO
BY McGlew and Toren
ATTORNEYS

INVENTOR.
YUKIO MASHIMO

BY McGlew and Toren
ATTORNEYS

FLASH DEVICE FOR A CAMERA

The present invention relates to a flash device for a camera and a photographing system, particularly relates to a flash device of one unit and a photographing system with an indicating means for indicating the state of a flash circuit under the control of a detector circuit to indicate an operative condition of a camera.

In many conventional exposure control devices for a camera an indicating means for the exposure control devices is used and the indicating means used in conventional exposure control devices has little necessity of indication of the condition of a flash device, because a conventional procedure for combining the flash device and the exposure control device is completed in a manner as described in U.S. Pat. No. 3,033,988. However, in such a conventional procedure, a high degree of technics of photographing is not applied.

Meanwhile, necessity for a flash device with an indicating means and a photographing system with an indicating means for the flash device increases in the field of flash photography as a flash device with a discharge tube triggered by a synchronizer is increasingly used widely in combination with an exposure control device for a camera, for example, with an electronic control circuit.

A main objects of the present invention is to provide a flash device and a photographing system to which a high degree of technics of photographing can be applied.

Another object and features of the present invention lie in a flash device for a camera comprising a flash circuit for illumination of a flash lamp, a detector circuit for detecting an output of the flash circuit, and an indicator means for indicating the state of the flash circuit under the control of the detector circuit to indicate operative condition of the camera, and a photographing system comprising; a flash device which comprises a flash circuit for illumination of a flash lamp, a detector circuit for detecting an output of the flash circuit, and an indicator means for indicating the state of the flash circuit under the control of the detector circuit to indicate an operable condition of the camera; an exposure control device; and a synchronizer for the synchronization of the flash device and the exposure control device.

Other objects and features and advantages of the present invention will be understood from the following descriptions of the present invention by reference to the attached drawings in which:

FIG. 11–A shows schematically an operator mechanism for the embodiment, for example, shown in FIG. 10 or FIG. 12.

FIG. 11–B shows schematically an operator mechanism for the embodiment shown in FIG. 13, 14 or 15.

Figure 1:
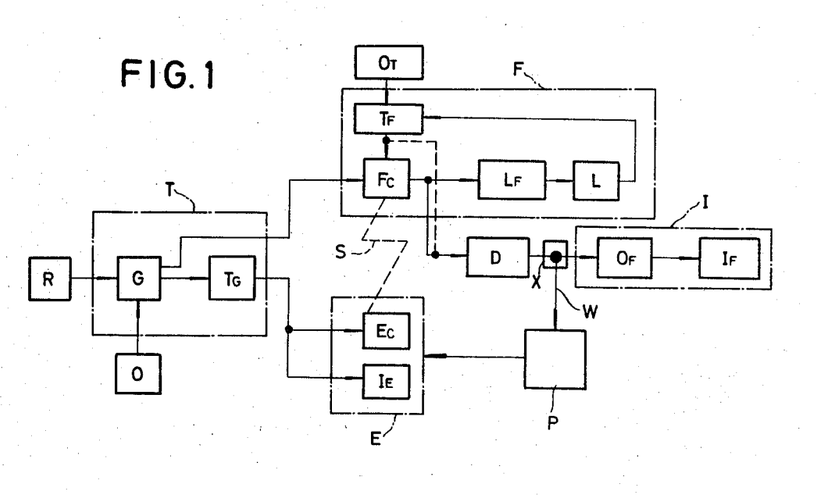
FIG. 1 is a schematic block diagram of an embodiment of the photographing system according to the present invention and a part of FIG. 1 represents also a schematic block diagram of an embodiment of the flash device according to the present invention.

In FIG. 1, R is a release member, G is a gating member which is driven by the release member R and which is controlled by an operator element O, $T_G$ is a gated timer which receives the output of the gating member G and which actuates an exposure control device E. The exposure control device E comprises an exposure control element $Ec'$ and an exposure indicator $I_E$ in combination. T is a timer which may provide a gating means G and a gated timer $T_G$ and the timer T receives an output from the release means R under the control of the operator element O. Fe is a flash circuit, D is a detector circuit, X is an operator circuit, $O_F$ is an oscillator circuit, and $I_F$ is an indicating means. I is an indicating means which may comprise the oscillator circuit $O_F$ and the indicating means $I_F$. The flash circuit Fc receives an output from the timer T or the gating means G and this flash circuit Fc transmits its output to a flash lamp $F_L$ for illumination of the light L and the detector circuit D for driving the indicating means I respectively. $O_T$ is a timer operator element for a timer $T_F$. The timer $T_F$ controls the flash circuit Fc to decrease extremely the intensity of the light L from the flash lamp $F_L$ and this timer $T_F$ may receive the light L directly or indirectly from an object to be photographed. F is a flash device which may comprise the timer $T_F$, the flash circuit Fc and the flash lamp $F_L$. The flash device F is controlled by the operator element $O_T$ and receives an output from the timer $T_F$ to transmit its output to the detector circuit D. S is a synchronizer for synchronization of the exposure control device E or Ec and the flash device F or the flash circuit Fc. The synchronizer S may be omitted in accordance with the construction of the timer T. W shows a path of an output from the detector circuit D to a photometric circuit P for the control of the exposure control device E.

Figure 2:
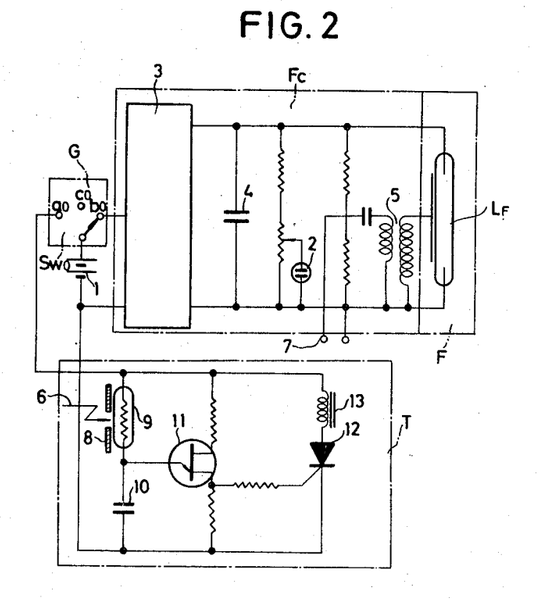
FIG. 2 is a schematic circuit construction of an embodiment of the flash unit according to the present invention.
Figure 3:
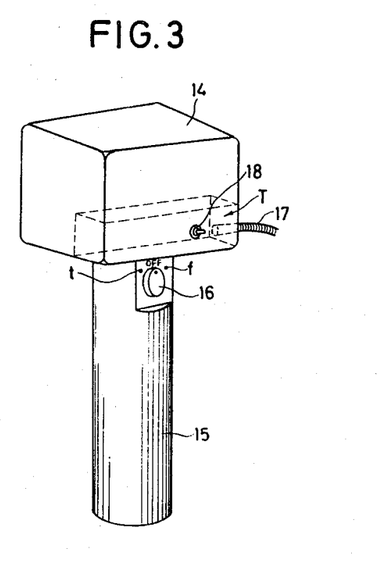
FIG. 3 is a perspective view of the flash unit the circuit construction of which is shown in FIG. 2.

The embodiment of the inventive flash unit shown in FIGS. 2 and 3 is assembled as a unity with a speed-light device F with a discharge tube $L_F$ triggered by a synchronizer supplied with a converted power source 3 of high voltage from a power source 1 of low voltage through a direct current convertor 3, a timer circuit T with a time constant circuit of a photoconductor 9 of CdS and a time capacitor 10, which is actuated by the power source 1 of low voltage, and a gating means G for changing over the power source 1 to actuate selectively either of the speed light device F and the timer circuit T.

Swo is a change-over switch, 2 is a indicating discharge lamp such as a neon lamp, 4 is a main capacitor, 5 is a triggering circuit, 7 is terminals for the synchronizer of a camera, Fc represents a flash circuit, 8 is a diaphragm mechanism adjustable in accordance with, for example, film sensitivity, 11 is a double base diode, 12 is a silicon controlled rectifier, 13 is an electro-magnet, and 6 shows a light from an object to be photographed.

The change-over switch Swo is selectively connectable with a terminal $a_o$ for the timer circuit T, with a terminal $b_o$ for the speed-light device F or with a terminal $c_o$ for switching off the current supply.

For flash photographing, a synchro-cord with terminals 7 must be connected with the synchro-terminals of the camera with the synchronizer, and the change-over switch Swo must be connected to the terminal $b_o$. Under this state the main capacitor 4 is charged up by the direct-current convertor 3 and the discharge lamp 2 illuminates when the charging-up is sufficiently completed, and when the synchronizer of the camera is closed the discharge tube $L_F$ starts its illumination. In unproper cases for flash photographing, the camera is fixedly supported, for example, on a tripod and a release cable 17 operatively connected with the electro-magnet 13 of the timer circuit T is mounted to the shutter release member of the camera and the change-over switch Swo is connected to the terminal $a_o$. The change-over switch Swo functions to start the timer circuit T. The electro-magnet 13 is energized a certain time after the change-over switch Swo is changed to the terminal $a_o$.

A releasing button 18 shown in FIG. 3 is pushed to push down the shutter release member of the camera to open the shutter blades through the release cable 17 shown in FIG. 3, and the releasing button 18 is associated with the change-over of the switch Swo to the terminal $a_o$. When the electro-magnet 13 is energized, the shutter releasing member of the camera returns back to its original position to close the shutter blades and to change over the switch $Sw_o$ to the terminal $C_o$. In this way a long-time exposure is effected. In the above case if the diaphragm mechanism 8 before the photoconductor 9 is adjusted in accordance with the film sensitivity, the Photo-conductor 9 attains a resistance value in accordance with the light 6 from the object, and the time constant of the photoconductor 9 and the time capacitor 10 is determined for attaining a proper long-time exposure automatically. Of course, in the latter case of the long-time exposure, the shutter releasing member of the camera should be settled to the bulb exposure. The timer $T_F$ may be used as the timer T with a slight modification.

Meanwhile, the timer circuit T shown in FIG. 2 may be used as a self-timer with a slight modification and in this case the electro-magnet 13 should be associated with the shutter release button of the camera.

Now particularly in FIG. 3, 14 is a housing of the flash unit, 15 is a grip installed with batteries of the power source 1, and 16 is a change-over member.

The cube shown by the dotted line represents an assembly of the timer circuit T.

With the embodiment shown in FIGS. 2 and 3 proper photographing under any condition is completed. This embodiment as a unit overcomes defects of conventional flash devices and attains merits of conventional booster timer devices for giving long-time exposure. That is, this embodiment is useful for proper flash photographing at rather short shooting distance and is useful for proper photographing without flashing at rather long shooting distance or is useful for proper photographing under inconvinient conditions for flash photographing. This embodiment eliminates the necessity of troublesome interchange of a conventional flash unit and of a conventional booster timer unit.

A reference mark on the change-over member 16 is positioned in FIG. 3 at "off" state of the flash unit.

When the change-over member 16 is rotated to a position $f$ for flash photography, the change-over switch Swo is connected with the terminal $b_o$, while when the change-over member 16 is rotated to a position $t$ for long-time exposure, the change-over switch Swo connected with the terminal $c_o$ is operatively engaged with the releasing button 18. The operative engagement of the switch Swo with the releasing button 18 prevents an erroneous shutter release operation due to the pushing of the releasing button 18.

Figure 4:
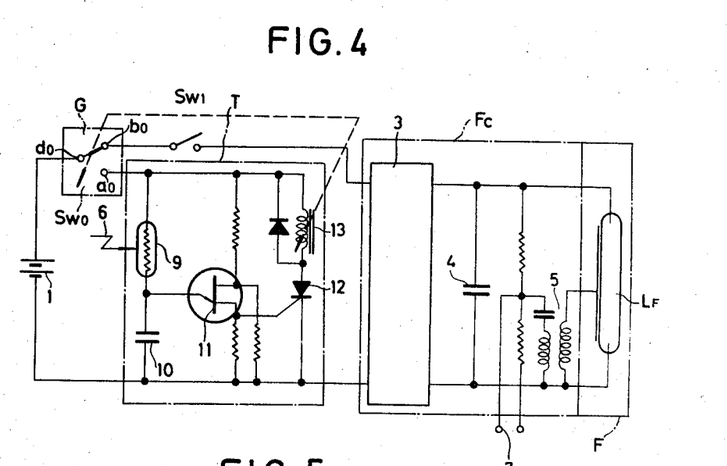
FIG. 4 is a schematic circuit construction of another embodiment of the inventive flash unit.
Figure 5:
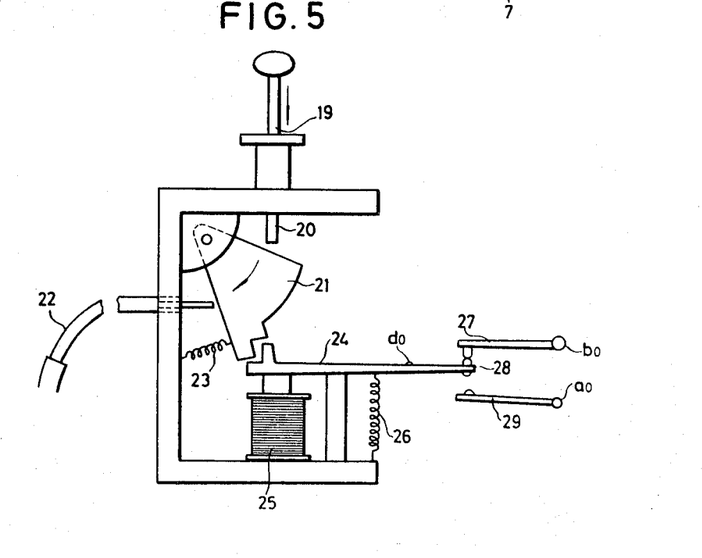
FIG. 5 shows schematically a change-over mechanism as gating means as shown in FIG. 4.

The embodiment shown in FIGS. 4 and 5 is assembled as a unity with a speed-light device F with a discharge tube $L_F$ triggered by a synchronizer supplied with a converted power source 3 of high voltage from a power source 1 of low voltage through a direct current convertor 3, a timer circuit T with an electro-magnet 13 and a time constant circuit of a photoconductor 9 of CdS and a time capacitor 10, which is actuated by the power source 1 to actuate selectively either of the speed light device F and the timer circuit T. Improvements over the embodiment shown in FIGS. 2 and 3 lie in that the gating means G is controlled operatively by the electro-magnet 13 of the timer circuit T to effect automatic change-over of the power source 1 to the timer circuit T only when the timer circuit is actuated by means of a releasing button 19 of the timer circuit T.

Sw1 is a main switch only for the flash device F, the electro-magnet 13 resets the switch Swo from the terminal $a_o$ to the terminal $b_o$ when the releasing button 19 is operated, and the construction of the timer circuit T is slightly modified from that shown in FIG. 2.

Referring particularly to FIG. 5, 20 is a pin, 21 is a cam member, 22 is a release cable similar to the release cable 17 in FIG. 3, 23 is a compression coil spring, 24 is a contact member, 25 is a coiling equivalent to the electro-magnet 13 in FIG. 4, 26 is a tension coil spring, and 27, 28 and 29 are contacts of the gating means G. $a_o$ and $b_o$ are terminals shown by $a_o$ and $b_o$ in FIG. 4. At the point $d_o$ the plus electrode of the battery 1 is connected with the contact member 24.

For flash photographing, the main switch Sw1 for the flash device F is closed. In the case the change-over switch Swo is normally connected with the terminal $b_o$. Therefore, the flash device F operates similarly to the embodiment shown in FIG. 2.

For long-time exposure, one end of the release cable 22 must be mounted on the shutter release button of the camera and the shutter mechanism is settled for bulb exposure. Under this state, the releasing button 19 is pushed to rotate the cam member 21 in a direction of an arrow through the pin 20 and the shutter of the camera is opened with the aid of the release cable 22. Meanwhile this rotation of the cam member 21 causes disengagement of the cam member 21 and the contact member 24 clamped each other, and permits a rotational motion of the contact member 24 by the aid of the tension spring 26. By the rotational motion of the contact member 24 the contact 28 is connected with the contact member 29 to start the timer circuit T. After a certain time of the timer operation, the coiling 25 is energized in a similar way as in the case of the embodiment shown in FIG. 2. By the energization of the coiling 25, the contact member 24 is attracted against the tension coil spring 26 and thus the cam member 21 is permitted to rotate in a counter-clockwise direction by the aid of the compression spring 23 and the shutter button of the camera which has been pressed down through the release cable 22 returns back to close the shutter.

Meanwhile when the contact member 24 is attracted by the coiling 25, the contact 28 of the contact member 24 contacts with the terminal $b_o$. The contact member 24 is clamped by the cam member 21 to reset the flash device automatically although the coiling 25 is dienergized. Therefore, this embodiment can actuate the timer independently with the main switch $Sw1$, can activate the speed-light device F only by the closure of the main switch $Sw1$ and can actuate the flash device F only by the closure of the main switch $Sw0$ and settlement of the shutter dial to the bulb-exposure, because the change-over switch $Sw0$ is normally connected with the terminal $b_o$ except when the change-over switch $Swo$ is changed over to the terminal $a_o$, for the timer actuation.

By the above embodiment, the necessity of troublesome change-over operation of the switch $Swo$ is eliminated, and thus erroneous operations are perfectly prevented.

This embodiment is advantageous for obtaining a proper long-time exposure even without use of a speed-light device or even when the speed-light device is out of its proper working range for the camera with a flash-auto mechanism.

It is very convenient to provide an indicating means for conditions such as a flash-ready condition in case when the speed-light device is used for the camera with a flash-auto mechanism.

The embodiments shown in FIGS. 6 7, 8 and 9 are examples of the circuit construction of the inventive photographing system with such indicating means.

Figure 6:
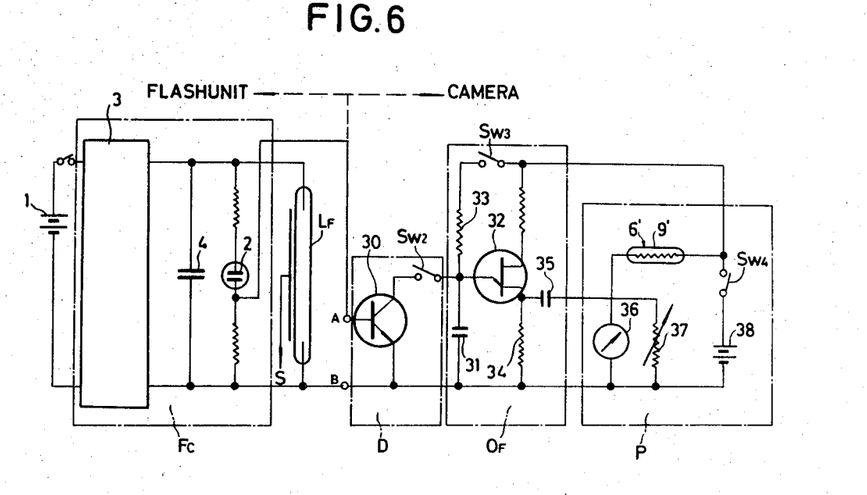
FIG. 6 is a schematic circuit construction of an embodiment of the inventive photographing system.
Figure 7:
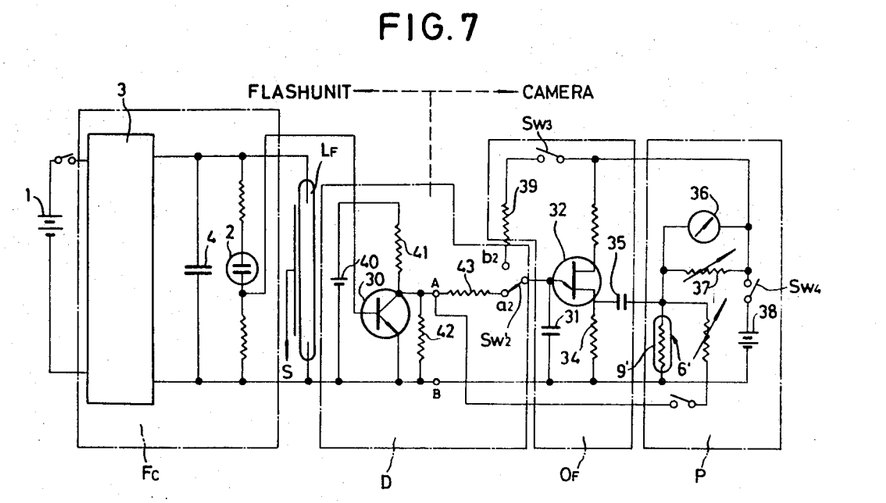
FIG. 7 is a schematic circuit construction of another embodiment of the inventive photographing system.

Each of the examples shown in FIGS. 6 and 7 comprises a detector circuit D with a transistor 30 for detecting the voltage across a main capacitor 4 of the speed-light device F, and an oscillator circuit $O_F$ which is controlled by the output of the detector circuit D and vibrates a pointer of an ammeter 36 of a photo-metric circuit P of a camera. The pointer of the ammeter 36 by its vibrational motion indicates a flash-ready condition and diviation from the working range of the system.

Figure 8:
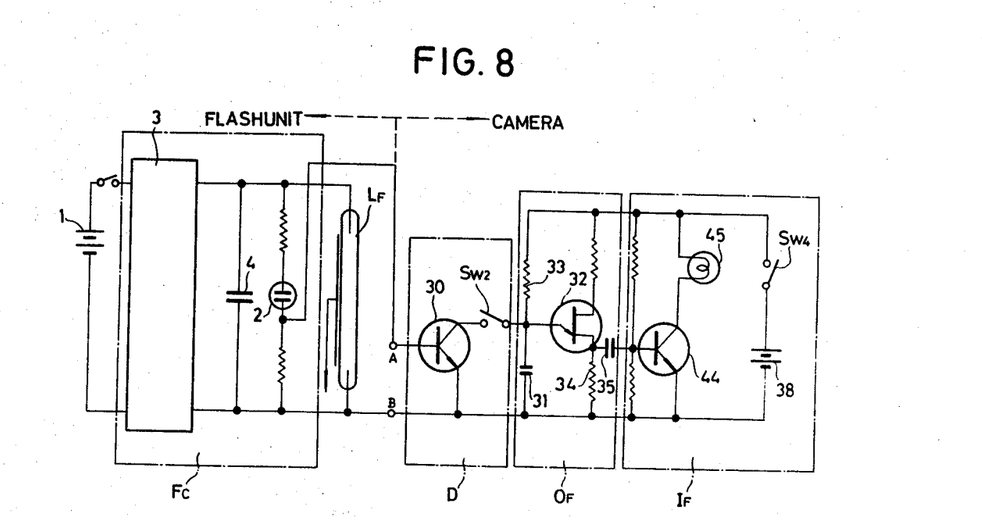
FIG. 8 and FIG. 9 are schematic circuit constructions of further other embodiments of the inventive photographing system or the inventive flash device.
Figure 9:
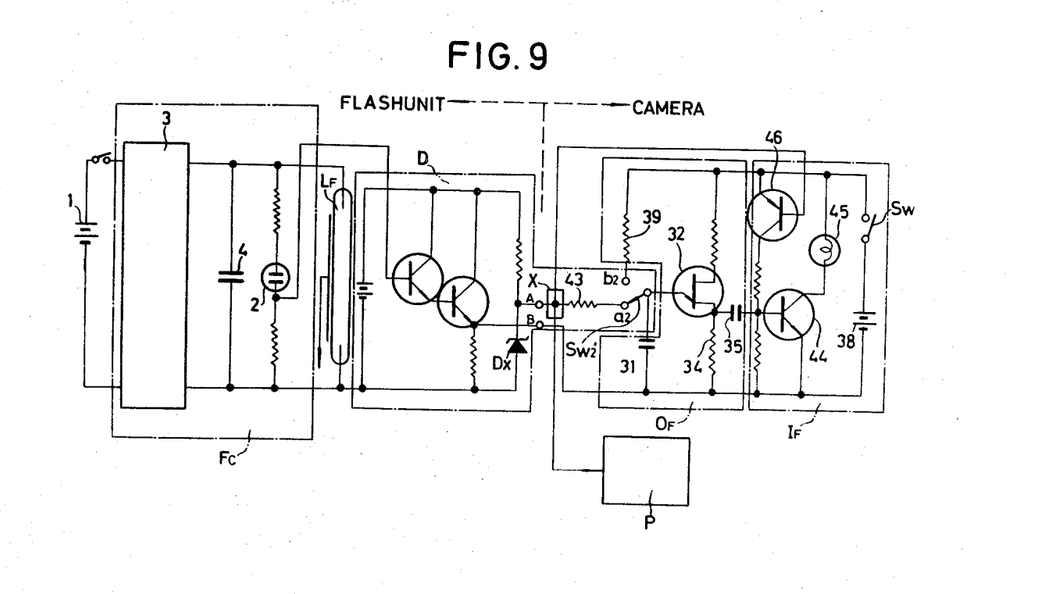

Meanwhile the examples shown in FIGS. 8 and 9 comprises a detector circuit D with a transistor 30, which is non-conductive when charging-up of the main capacitor 4 is not completed, for detecting the voltage across a main capacitor 4 of the speed-light device F, and an oscillator circuit $O_F$ which is controlled by the output of the detector circuit D and flickers an indicator lamp 45 of a flash indicator $I_F$. The lamp 45 by its flickering indicates a flash ready condition or deviation from the working range of the system.

In FIGS. 6, 7, 8 and 9, 31 is a capacitor of the oscillator circuit $O_F$, 32 is a double base diode 33 or 39 is a resistor of the oscillator circuit $O_F$, and 34 is a load resistor. The capacitor 31 and the resistor 33 or 39 constitute a time constant circuit of the oscillator circuit $O_F$ and determine the oscillating frequency of the oscillator circuit $O_F$. 35 is a coupling capacitor for the photometric circuit P with the ammeter 36 or for the flash indicator $I_F$ with the indicator lamp 45. The photometric circuit P shown in FIG. 6 or 7 further comprises a photoconductor 9', a film-sensitivity variable resistor 37, batteries 38, and a switch $Sw4$. $Sw3$ shown in FIGS. 6 or 7 is a switch which is closed when the flash unit is coupled with the camera. $Sw2$ shown in FIGS. 6 or 8 is a switch which is opened when the flash-auto mechanism of the camera is out of the working range of the flash unit.

Functional description of the embodiment shown in FIG. 6 will be made.

In case of flash photographing, the flash unit is coupled with the camera and a controller cord is connected with terminals A, B of the camera as shown in FIG. 6. Under this state, a synchro-cord of the flash unit must be connected to terminals for the synchronizer of the camera and the switch $Sw3$ is closed. The closure of the switch $Sw4$ actuates the indicator ammeter 36 of the photometric circuit P.

Under this state, in case when the speed-light device does not arrive at a flash ready condition, the transistor 30 does not become conductive.

In this state, the double base diode 32 of the oscillator circuit $O_F$ serves for its oscillation as the by-pass path for the capacitor 31 of the transistor 30 is not completed although the switch $Sw2$ is closed. Thus the pulses of frequency determined by the circuit construction of the oscillator circuit $O_F$ appear in the load resistor 34 and these pulses are given to the photometric circuit P through the coupling capacitor C for smoothing, and thus the pointer of the ammeter 36 vibrates with a frequency equal to that of the pulses. This vibration indicates that the speed-light device is not ready.

In case when the main capacitor 4 of the speed-light device does not arrive at the charge-up voltage for illumination of the discharge tube $L_F$, the neon lamp 2 illuminates and voltage difference appears between the terminals A and B. Due to the voltage difference the transistor 30 becomes conductive and the capacitor 31 is terminated by the transistor 30 through the switch $Sw_2$ for effecting stoppage of oscillation of the oscillator circuit $O_F$ and for effecting stoppage of vibration of the pointer of the ammeter 36 of the photometric circuit P.

In this way, the stoppage of the pointer vibration indicates the flash-ready condition of the speed-light device.

In case when adjustable rings for diaphragm and shooting distance of the camera deviate from the proper working range of the system, the switch $Sw2$ is opened. At this state, as the oscillator circuit $O_F$ does not receive any effect from the detector circuit D, the ammeter pointer vibrates to indicate or warn against the unproperbly combined state of the flash unit and the camera. When the ammeter pointer is provided in the view-field of the camera finder, this system attains further advantages.

The functional description of the example shown in FIG. 7 will be made but only for the differences from the example shown in FIG. 6.

In case when the speed-light device is not ready, the transistor 30 in the flash unit is non-conductive. Therefore, a connecting point of a resistor 41 and a resistor 42 is bleeded with power supply from a battery 40 to give a potential difference between the terminals A and B of the camera. Due to this potential difference, the capacitor 31 is charged through a resistor 43 and a switch $Sw2'$ similar to the switch $Sw2$ in FIG. 6 to give pulsive voltage between both terminals of the load resistor 34, and thus the ammeter pointer vibrates.

In case of flash ready, the neon lamp 2 illuminates and the transistor 30 is conductive. Therefore, no voltage difference appears between the terminals A and B and thus the vibration of the ammeter pointer stops due to the stoppage of oscillation of the oscillator circuit $O_F$.

The change-over switch $Sw2'$ is changed over from a terminal $a_2$ to a terminal $b_2$ under the condition beyond the working range of the system. At this state, the resistor 39 and the capacitor 31 contribute for oscillation of the oscillator circuit $O_F$ to warn against working range of the system with the aid of the pointer vibration.

As the oscillator circuit $O_F$, circuits with other semiconductors as a transistor or a silicon controlled rectifier may be used.

In the examples shown in FIGS. 6, 7, 8 and 9, the switching action of the detector circuit D is advantageously adapted for the stoppage of the oscillator circuit $O_F$. In the examples shown in FIGS. 8 and 9, the lamp 45 is provided as an indicating means, and therefore the lamp 45 may be very conveniently and easily provided in or near the view-field of the camera finder to illuminate the finder screen with signals for the photographing informations even under a darked condition of the object to be photographed.

The flash indicator $I_F$ in FIGS. 8 and 9 comprises an output transistor 44, a small indicator lamp 45, batteries 38, and a switch $Sw_4$.

Functions of the example shown in FIG. 8 are very similar to those of the example shown in FIG. 6.

Under the unready condition of the flash unit, the output pulses are given to the base of transistor 44 of the flash indicator $I_F$ through the coupling condensor 35. As the transistor 44 is biased in a conductive state with no input from the oscillator circuit $O_F$ and is inverted to non-conductive state with the pulse peak of the input pulses from the oscillator circuit $O_F$, the indicator lamp 45 as a collector load to the transistor 44 flickers with a frequency equal to that of the pulses. Thus, the unreadiness is indicated. Under flash-ready condition, the indicator lamp 45 continues its illumination with constant intensity. Thus the readiness is indicated.

When the switch $Sw2$ is opened due to deviation from the working range of the system, the lamp 45 flickers, thus warning against the working range of the system.

In the example shown in FIG. 9, a photometric circuit P of the camera is controlled by an output from the detector circuit D of the speed-light device to attain a proper exposure in response to the guide number of the speed-light device and the system comprises a flash indicator $I_F$ similar to that shown in FIG. 8 and an oscillator circuit $O_F$ similar to that shown in FIG. 7.

In FIG. 9, 46 is a switching transistor the base of which is connected to the terminal A, $D_X$ is a Zenor diode provided in the detector circuit D, and the breakdown voltage of the Zenor diode $D_X$ is supposed to be equal to the supplied voltage from the battery 38. X is an operator circuit for equalization of the break-down voltage of the Zenor diode $D_X$ and the supplied voltage from the battery 38. The construction of the operator circuit X depends on the break-down voltage and the supplied voltage.

Under the unready condition of the speed-light device, the transistors of the detector circuit are non-conductive and the constant break-down voltage of the Zenor diode $D_X$ is given between the terminals A and B to oscillate the oscillator circuit $O_F$ with a time constant of the capacitor 31 and the resistor 43. Meanwhile, the switching transistor 46 is non-conductive because the potential given to its base is equal to that given to its emitter. As a result, pulses from the oscillator circuit $O_F$ through the coupling resistor 35 are given to the base of the transistor 44 to flicker the indicator lamp 45 with a constant frequency. Thus the unreadiness is indicated.

When the flash-ready condition is attained the potential difference between the terminals A and B approaches suddenly near zero. Due to this sudden decrease of the potential difference, the oscillator circuit $O_F$ stops its oscillation. Meanwhile, the transistor 46 is inverted to a conductive state to permit a constant current through the indicator lamp 45 with the aid of the output transistor 44. The constant illumination from the lamp 45 indicates a flash ready state of the speed-light device.

Flickering of the lamp 45 warns against the working range of the system as in the case of the example shown in FIG. 8.

The embodiment shown in FIG. 10, 12, 13, 14 or 15 comprises a time constant circuit $T_F$ for the trigger of a by-pass tube 51 which is triggered by a triggering circuit 52 of a flash circuit Fc for termination of the illumination of a discharge tube $L_F$, the flash circuit Fc, a detector circuit, the discharge tube $L_F$ being supplied with the current from the main capacitor 4 and triggered by a trigger circuit 5 of the flash circuit Fc, an oscillator circuit $O_F$, an indicating lamp $I_F$ which indicates by its flickering the deviation beyond the working range of the system, a time constant circuit $T_F$ for the trigger of the by-pass tube 51 with a variable resistor 57 for photographing informations and a controller switch $O_T$ such as $Sw7$, $Sw8$ or $Sw8'$ which is actuated in accordance with the deviation of the variable resistor of the time constant circuit $T_F$ beyond the working range of the system for preventing erroneous trigger of the discharge tube $L_F$, and a synchronizer S.

Figure 10:
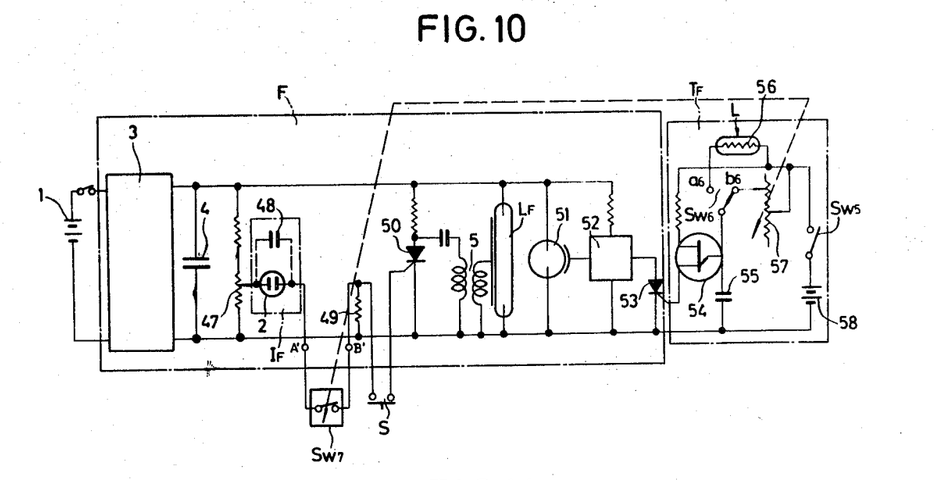
FIG. 10 is a schematic circuit construction of a still another embodiment of the inventive flash device or photographing system.

In the embodiment shown in FIG. 10, 47 is a potentiometer of the detector circuit, 48 is a capacitor which may be connected in parallel with the neon discharge lamp 2 for flash-ready indication, 49 is a resistor, 50 is a thyrister for the trigger of the discharge tube $L_F$, 53 is a thyrister for the trigger of the by-pass tube 51, 54 is a double base diode, 55 is a capacitor of the flash timer $T_F$, $Sw6$ is a change-over switch, 56 is a photoconductor which receives the light L from the object to be photographed, and Sw5 is a switching means. The switching means Sw5 may be associated with the synchronizer S of the camera, and may be replaced by a semi-conductor switching means which becomes conductive, for example, with the aid of the variation of the voltage across the main capacitor 4 only when the discharge lamp $L_F$ illuminates.

Figure 11:
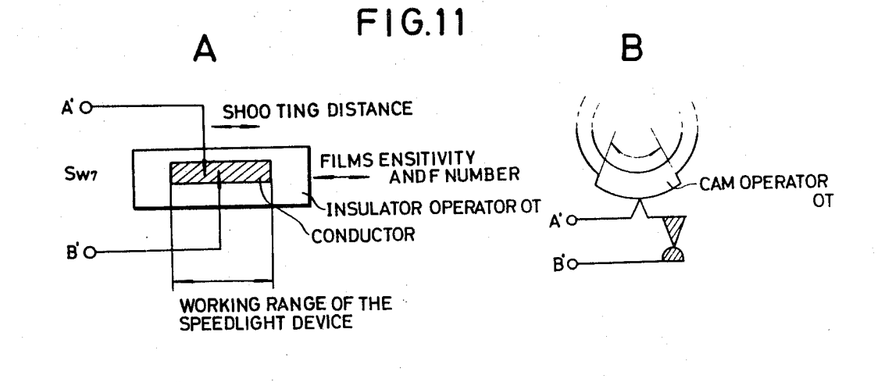

Functional description of the embodiment shown in FIG. 10 will be made by referring to FIGS. 11–A.

The variable resistor 57 is similar to that used in a camera sold under a trademark "New Canonet" by Canon Kabushiki Kaisha of Tokyo, Japan. The construction of the switch Sw7 is illustratively shown in FIG. 11–A.

Within the working range of the speed-light device F, the conductor provided for example on a lens barrel functions as the closed switch Sw7. On the contrary, beyond the working range, the switch Sw7 is opened because the terminal A' is not connected to the terminal B' through the conductor or the switch Sw7.

When the main switch (not shown) of the speed-light device F is closed, the main capacitor 4 is charged up to illuminate the neon lamp 2 if the switch Sw7 is closed within the working range of the speed-light device F. The illumination of the neon lamp 2 indicates a flash-ready condition within the working range of the system. At this state when the synchronizer S contacts with the thyrister 50, the thyrister 50 turns on to trigger the discharge lamp $L_F$ through the trigger circuit 5 to start illumination of the discharge tube $L_F$. Meanwhile the flash timer $T_F$ starts by the closure of the switch Sw5 which is closed at the start of the illumination. The flash timer triggers the by-pass tube 51 after a certain time determined by the variable resistor 57 and the capacitor 55. Thus the proper guide number of the discharge tube $L_F$ is attained.

Beyond the working range of the system, the switch Sw7 is opened and non-illumination of the neon lamp 2 warns against the working range. At this state even if the synchronizer S is erroneously closed, the thyrister 50 is not turned on and thus prevents an erroneous illumination of the discharge tube $L_F$. The capacitor 48 can flicker the lamp 2.

Figure 12:
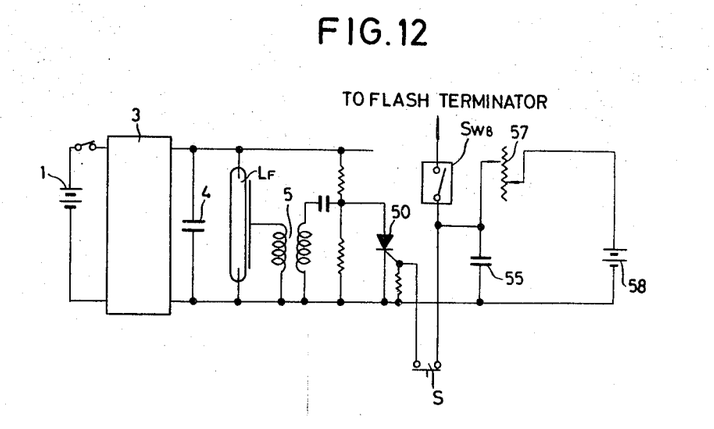
FIG. 12 is a schematic circuit construction of a still further another embodiment of the inventive flash unit.

In the embodiment shown in FIG. 12, Sw8 is a normally opened semi-conductor switch which becomes conductive when the discharge tube $L_F$ illuminates. The operation of this embodiment is quite similar to that shown in FIG. 10.

Figure 13:
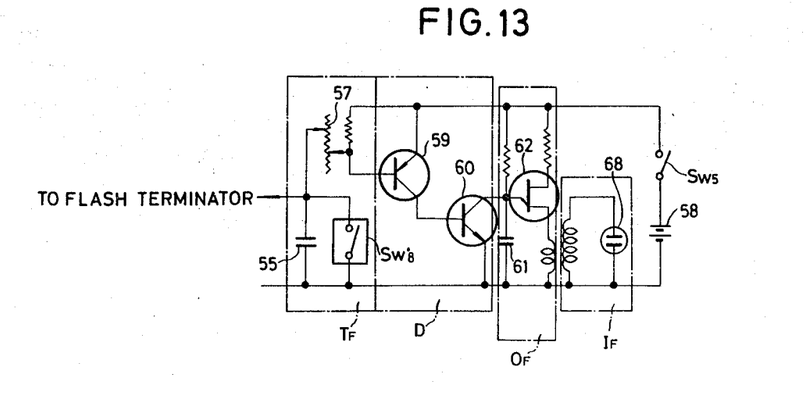
FIGS. 13, 14 and 15 are schematic circuit constructions in part of modified embodiments of the inventive flash device or photographing system.
Figure 14:
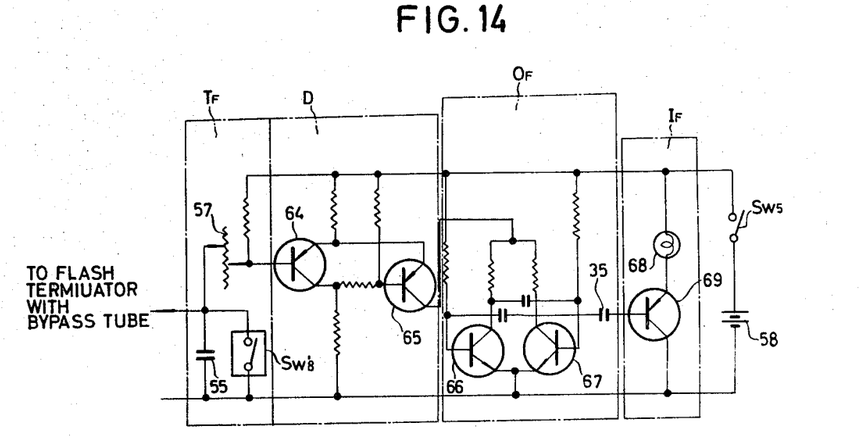
Figure 15:
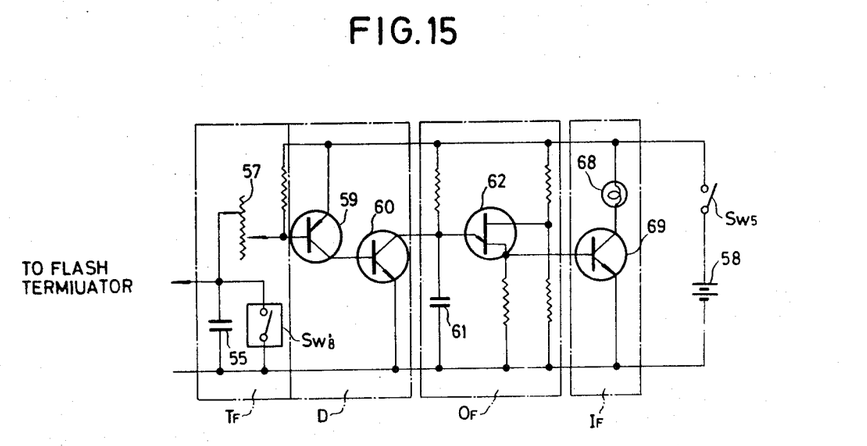

In the circuits shown in FIGS. 13, 14 and 15 the variable resistor 57 of the flash timer $T_F$ is connected in series with a switch Sw8'. The construction of the switch Sw8' is illustratively shown in FIG. 11–B. The detector circuit D in FIGS. 13, 14 or 15 is responsive to the time constant of the flash timer $T_F$ for flash termination. As a flash termination with a by-pass tube of the flash circuit Fc is connected from the flash timer $T_F$, and as the detector circuit is connected to the flash timer, the indicator lamp of the flash indicator $I_F$ indicates a proper combination of the system with the aid of the oscillator.

The switch Sw8' is opened when the discharge tube $L_F$ illuminates. As indicator neon lamp 63 of the flash indicator $I_F$ in FIG. 13 flickers for warning against the working range of the flash device when the variable resistor 57 is not in the working range because transistors 59 and 60 of the detector circuit D become non-conductive and a capacitor 61 and a double base diode 62 of the oscillator circuit $O_F$ continue the oscillation. In this case the capacitor 61 is connected in parallel with the transistor 60.

The oscillator circuit $O_F$ and the flash indicator are coupled with a transformer.

In the circuit shown in FIG. 14 the detector circuit D is connected in series with the oscillator circuit $O_F$ to control the flash indicator $I_F$. The detector circuit D comprises a Schmitt circuit of transistors 64 and 65. The oscillator circuit $O_F$ of an astable multi-vibrator with transistors 66 and 67 is triggered by the output of the Schmitt circuit. A small indicator lamp 68 flickers for worning against the working range with the aid of a transistor 69 coupled with the output terminal of the astable multi-vibrator through the coupling capacitor 35.

The circuit construction shown in FIG. 15 is very similar to that shown in FIG. 13, but is simplified in its construction. In FIG. 15 as the flash indicator consists of a lamp 68 and the transistor 69, the transformer needed in FIG. 13 for illuminating the neon discharge lamp 63 is omitted.

What is claimed is:

1. A flash device for a camera used with a flash lamp, comprising flash circuit means connected to the flash lamp for actuating the flash lamp so as to illuminate the flash lamp, said flash circuit means forming an output representing electrical parameters applied to the lamp, detector circuit means responsive to said flash circuit means for detecting the output, oscillator circuit means responsive to said detector circuit means for producing signals on the basis of the output of said detector circuit means, and indicator means responsive to said oscillator circuit means for producing a signal corresponding to the operation of said oscillator circuit means.

2. A flash device for a camera operable with a flash lamp, comprising a flash circuit for illumination of the flash lamp, a detector circuit for detecting an output of the flash circuit, an oscillator circuit controlled by a detected output of the detector circuit, indicator means responsive to said oscillator circuit for indicating the state of the flash circuit on the basis of the detector circuit and the oscillator circuit, and a signal delivery passage extending from the flash circuit to the indicator means and formed by the detector circuit and oscillator circuit for indicating the condition of the flash device.

3. A device as in claim 2 further comprising a smoothing coupling capacitor for coupling the oscillator circuit with the indicating means.

4. A device as in claim 2, wherein said detector circuit includes a diode having a breakdown voltage, said oscillator circuit having a power source, the voltage of the power source for the oscillator circuit means being equal to the breakdown voltage of said diode.

5. A device as in claim 2, wherein said oscillator comprises an astable multivibrator.

6. A device as in claim 2, wherein said oscillator circuit is series-connected with said detector circuit.

7. A device as in claim 2, wherein said oscillator circuit includes a timer circuit and a double-base diode.

8. A device as in claim 7, wherein said detector circuit includes an output and said timer circuit includes a capacitor connected in parallel with an output of said detector circuit.

9. A flash device for a camera, comprising a flash discharge lamp having triggering means for starting illumination of said lamp, a flash circuit connected to said triggering means for illumination of said flash discharge lamp, said flash discharge circuit having a terminating circuit for termination of the illumination of the flash discharge lamp, said flash circuit having an output corresponding to the operating condition of said flash circuit, a detector circuit for detecting the output of the flash circuit, indicator means responsive to said detector circuit for indicating the state of the flash device, a timer circuit in said terminating circuit for termination of illumination of said discharge lamp, and a network having synchronizer means coupled to said flash circuit for triggering said lamp in response to a signal from the camera so as to effect a proper amount of illumination, said network having means to indicate the condition of the flash circuit.

10. A device as in claim 9, wherein said timer circuit comprises a photosensitive element.

11. A device as in claim 9, wherein said timer circuit comprises a variable resistor.

12. A device as in claim 9, wherein said timer circuit includes error-preventing switchover means having a variable resistor.

13. A photographic system using a flash lamp comprising: a flash device including a flash circuit for illumination of the flash lamp, a detector circuit for detecting the output of the flash circuit, indicator means responsive to the detector circuit for indicating the state of the flash circuit so as to indicate an operable condition for the camera; an exposure control device connected to said flash circuit; synchronizer means for synchronizing the flash device and the exposure control device; an operator element; and a timer circuit responsive to said operator element and connected to said flash circuit.

14. A system as in claim 13, wherein said timer circuit actuates the flash circuit in response to said operator element.

15. A system as in claim 13, wherein said timer circuit actuates said exposure control device.

16. A system as in claim 13, wherein said timer circuit comprises a photosensitive element.

17. A system as in claim 13, further comprising gating means coupled to said timer circuit for controlling said timer circuit, said gating means being operatively controlled by said operator element.

18. A system as in claim 13, wherein said timer circuit comprises an electromagnet.

19. A flash device for a camera using a flash lamp, comprising a flash circuit for illumination of the flash lamp, a detector circuit responsive to said flash circuit for detecting an output of said flash circuit, indicator means responsive to said detector circuit for indicating the state of the flash circuit thereby to indicate the operative condition of the camera, and a timer circuit connected to said flash circuit, gating means for said timer circuit, operating means, said gating means being operatively controlled by said operating means for controlling said timer circuit.

20. A device as in claim 19, wherein the timer circuit comprises an electromagnet, said electromagnet being operatively coupled to the camera for controlling shutter release operations of the camera.

21. A device as in claim 19, wherein said timer circuit comprises an electromagnet, the camera having shutter release means and shutter closure means, said electromagnet being coupled to said shutter closure means for delaying the shutter closure means.

22. A device as in claim 19 wherein said gating means forms the output of said timer circuit.

* * * * *